(12) United States Patent
Morinaga et al.

(10) Patent No.: US 8,817,632 B2
(45) Date of Patent: Aug. 26, 2014

(54) METHOD OF MEASURING PACKET LOSS RATE, PACKET LOSS RATE MEASURING DEVICE AND STORAGE MEDIUM

(75) Inventors: Masanobu Morinaga, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 458 days.

(21) Appl. No.: 12/624,928

(22) Filed: Nov. 24, 2009

(65) Prior Publication Data
US 2010/0135180 A1 Jun. 3, 2010

(30) Foreign Application Priority Data
Dec. 1, 2008 (JP) ................................. 2008-306187

(51) Int. Cl.
*H04L 1/00* (2006.01)
*H04L 12/26* (2006.01)

(52) U.S. Cl.
CPC .................................. *H04L 43/0829* (2013.01)
USPC ............................ 370/241; 370/242; 370/252

(58) Field of Classification Search
USPC .......................................... 370/241, 242, 252
See application file for complete search history.

(56) References Cited

U.S. PATENT DOCUMENTS

| 6,850,525 | B2 * | 2/2005 | Mitsumori et al. ...... 370/395.52 |
| 7,230,919 | B2 * | 6/2007 | Flanagan et al. .............. 370/230 |
| 2008/0101227 | A1 | 5/2008 | Fujita et al. |
| 2008/0186866 | A1 * | 8/2008 | Morinaga et al. ............. 370/247 |
| 2008/0298271 | A1 | 12/2008 | Morinaga et al. |
| 2009/0303892 | A1 * | 12/2009 | Yamasaki ..................... 370/252 |
| 2010/0177643 | A1 * | 7/2010 | Matta et al. ................... 370/248 |
| 2012/0011413 | A1 * | 1/2012 | Liu et al. ....................... 714/746 |

FOREIGN PATENT DOCUMENTS

| JP | 2005-286900 | 10/2005 |
| JP | 2008-113186 | 5/2008 |
| JP | 2008-219869 | 9/2008 |

* cited by examiner

*Primary Examiner* — Jason Mattis
(74) *Attorney, Agent, or Firm* — Staas & Halsey LLP

(57) ABSTRACT

A method of measuring packet loss rate and device thereof, includes intermittently capturing packets during a session, counting a capture success number indicating a number of the packets captured in every period of a time for capturing the packets, and a capturable number indicating a possible number of the packets to be captured during the period of time without loss, calculating a loss rate indicating a rate of losing the packets, according to the capture success number and the capturable number for every period of time and correcting the loss rate, by the measuring device, so that the loss rate gets larger accordingly as average of capturable numbers of respective periods of time is smaller.

10 Claims, 11 Drawing Sheets

FIG. 4

LOSS RATE MEASUREMENT RESULT ~HG1

| PHONE NUMBER OF CALLING TERMINAL | PHONE NUMBER OF RECEIVING TERMINAL | JITTER | APPARENT LOSS RATE Ro | REAL LOSS RATE R | CONSECUTIVELY RECEIVABLE PACKET AVERAGE |
|---|---|---|---|---|---|
| 078-000-1111 | 078-123-4567 | 1.2ms | 4.0% | 5.0% | 10 |
| 092-111-2222 | 078-135-7913 | 0.3ms | 2.7% | 3.0% | 20 |
| ... | ... | ... | ... | ... | ... |

| SET VALUE OF SIMULATION | | | SIMULATION | |
|---|---|---|---|---|
| PN | PM | R'(%) | Ro'(%) | |
| 5 | 20 | 5.0000 | 2.9589 | 8a(8) |
| 10 | 40 | 5.0000 | 3.9887 | 8b(8) |
| 50 | 200 | 5.0000 | 4.7994 | 8c(8) |
| 100 | 400 | 5.0000 | 4.8992 | 8d(8) |
| 5 | 45 | 1.0000 | 0.5959 | 8e(8) |
| 10 | 90 | 1.0000 | 0.7992 | 8f(8) |
| 50 | 450 | 1.0000 | 0.9624 | 8g(8) |
| 100 | 900 | 1.0000 | 0.9762 | 8h(8) |
| 5 | 45 | 5.0000 | 2.9533 | 8i(8) |
| 10 | 90 | 5.0000 | 3.9867 | 8j(8) |
| 50 | 450 | 5.0000 | 4.8071 | 8k(8) |
| 100 | 900 | 5.0000 | 4.9057 | 8l(8) |

604

| R'<br>n' | REAL LOSS RATE R=0.63% | R'<br>n' | REAL LOSS RATE R=4.47% |
|---|---|---|---|
| 160 | Ro'=0.70%±0.33%<br>(0.37% ≤ Ro' ≤ 1.03%) | 184 | Ro'=3.98%±0.77%<br>(3.21% ≤ Ro' ≤ 4.75%) |
| 42 | Ro'=0.70%±0.42%<br>(0.28% ≤ Ro' ≤ 1.12%) | 41 | Ro'=3.98%±0.98%<br>(3.00% ≤ Ro' ≤ 4.96%) |
| 23 | Ro'=0.70%±0.19%<br>(0.51% ≤ Ro' ≤ 0.89%) | 21 | Ro'=4.02%±1.29%<br>(2.73% ≤ Ro' ≤ 5.31%) |
| 12 | Ro'=0.72%±0.64%<br>(0.08% ≤ Ro' ≤ 1.38%) | 11 | Ro'=4.11%±1.68%<br>(2.43% ≤ Ro' ≤ 5.79%) |
| ⋮ | ⋮ | ⋮ | ⋮ | under the (1) heading on page 1 of US 8,817,632 B2:

METHOD OF MEASURING PACKET LOSS RATE, PACKET LOSS RATE MEASURING DEVICE AND STORAGE MEDIUM

CROSS-REFERENCE TO RELATED APPLICATIONS

This application is based upon and claims the benefit of priority of the prior Japanese Patent Application No. 2008-306187, filed on Dec. 1, 2008, the entire contents of which are incorporated herein by reference.

FIELD

Embodiments relates to a method and a device for measuring loss rate of packets.

BACKGROUND

According to the development of information communication technique, two-way communication through a packet switched network such as IP (Internet Protocol) network has been performed actively.

Especially, in these years, a technique of an IP phone using a function of VoIP (Voice over IP) has been prevalent. In the technique of the IP phone using the function of VoIP (Voice over IP), sound data is packetized and the packetized sound data is transmitted between a plurality of terminals through the packet switched network. This enables voice call through the Internet. Further, the IP phone may reduce the cost that would be necessary for the facilities and management of the typical so-called fixed phone network and reduce a basic charge and a call charge more than heretofore.

The quality of the communication, however, becomes unstable unlike the typical fixed phone network, because of passing through the Internet. A business provider supplying the IP phone service has to monitor and control the communication quality in order to ensure a certain communication quality. Taking into consideration that the communication amount of the IP phone calls is increasing more and more, it is required that the communication quality is monitored more accurately.

As the typical method for measuring the quality of a call, the following one is proposed. According to the method described in Japanese Patent Application Laid-Open No. 2005-286900, respective measuring devices are set at a plurality of points on a network. The measuring device measures a state of the communication at a point, based on the packet information about communication packets passing through the point where the measuring device is set, and transmits the measurement result to a collecting device, correspondingly to the measuring device identifying information for identifying the above measuring device and the communication identifying information for identifying the measured communication. The collecting device analyzes the communication quality based on the communication state information and the measuring device identifying information corresponding to the communication identifying information transmitted from the respective measuring devices.

According to the method described in Japanese Patent Application Laid-Open No. 2008-113186, a QoS routing device, which is a node of a logic network for transmitting the data transmitted between the user terminals checks whether the received data is specific data or not, forwards the data, measures each communication quality value of each link connected to its own device according to the flow of the specific data, to require the measurement accuracy of the communication quality value for every link, and assigns the number of the flows of the specific data at higher ratio to the link with the less measurement accuracy.

As an index indicating the communication quality, there is the loss rate of packets. For measuring the loss rate of the packets, it is necessary to capture a packet by some method. There are a passive method and an active method mainly as the method for capturing a packet. According to the passive method, the measuring device is set on a network and the packet flowing in the network is captured. According to the active method, two terminals for test are prepared. One terminal transmits a packet through the network and the other terminal receives the packet.

SUMMARY

According to an aspect of the invention, a method and system of measuring packet loss rate are provided. The method includes intermittently capturing packets during a session, by a measuring device, counting a capture success number indicating a number of the packets captured, in every period of a time for capturing the packets, and a capturable number indicating a possible number of the packets to be captured during a period of time without loss, by the measuring device, calculating a loss rate indicating a rate of losing the packets, according to the capture success number and the capturable number for every period of time, by the measuring device, and correcting the loss rate, by the measuring device, so that the loss rate gets larger accordingly as average of capturable numbers of respective periods of time is smaller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates an example of an operation result screen;

FIG. 9 illustrates an example of a loss rate relating table;

DETAILED DESCRIPTION OF EMBODIMENTS

Figure 1:
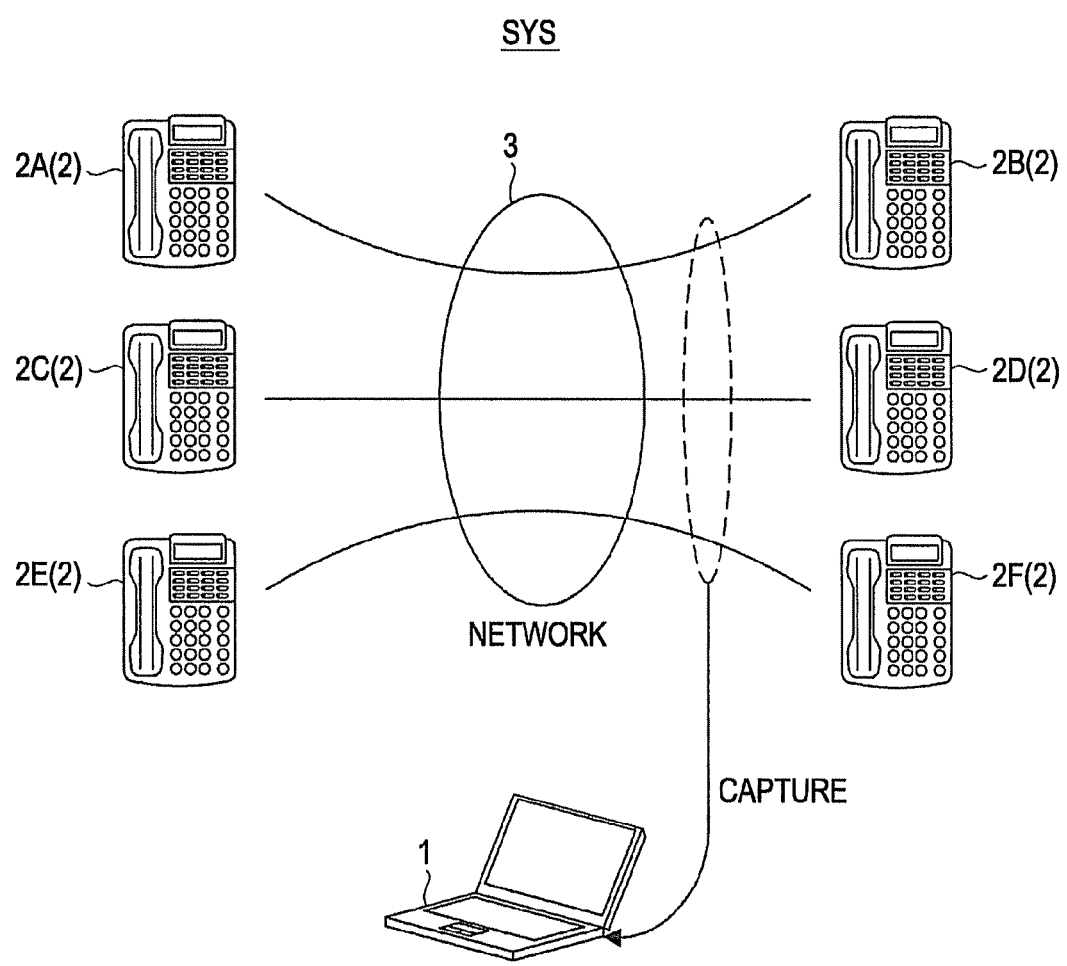
FIG. 1 illustrates an example of a general configuration of a VoIP phone system.

Reference will now be made in detail to the embodiments, examples of which are illustrated in the accompanying drawings, wherein like reference numerals refer to the like elements throughout. The embodiments are described below to explain the present invention by referring to the figures.

When a measuring device is of high performance, it may be possible to capture every packet even in the passive method. The high performance device, however, is very expensive and the cost is high. In order to reduce the cost by use of a cheaper measuring device, it is necessary to sample the packets and measure the loss rate to reduce the processing load on the measuring device. In this case, the actual (real) loss rate may not be obtained.

As mentioned above, however, according to the widespread use of the IP communication such as the IP phone, it is required that the call quality is monitored more and more accurately.

In consideration of such a problem and others including those existing in the typical system, the embodiments aim to measure the loss rate more accurately than heretofore, in the case of sampling the packets and measuring the loss rate.

Figure 2:
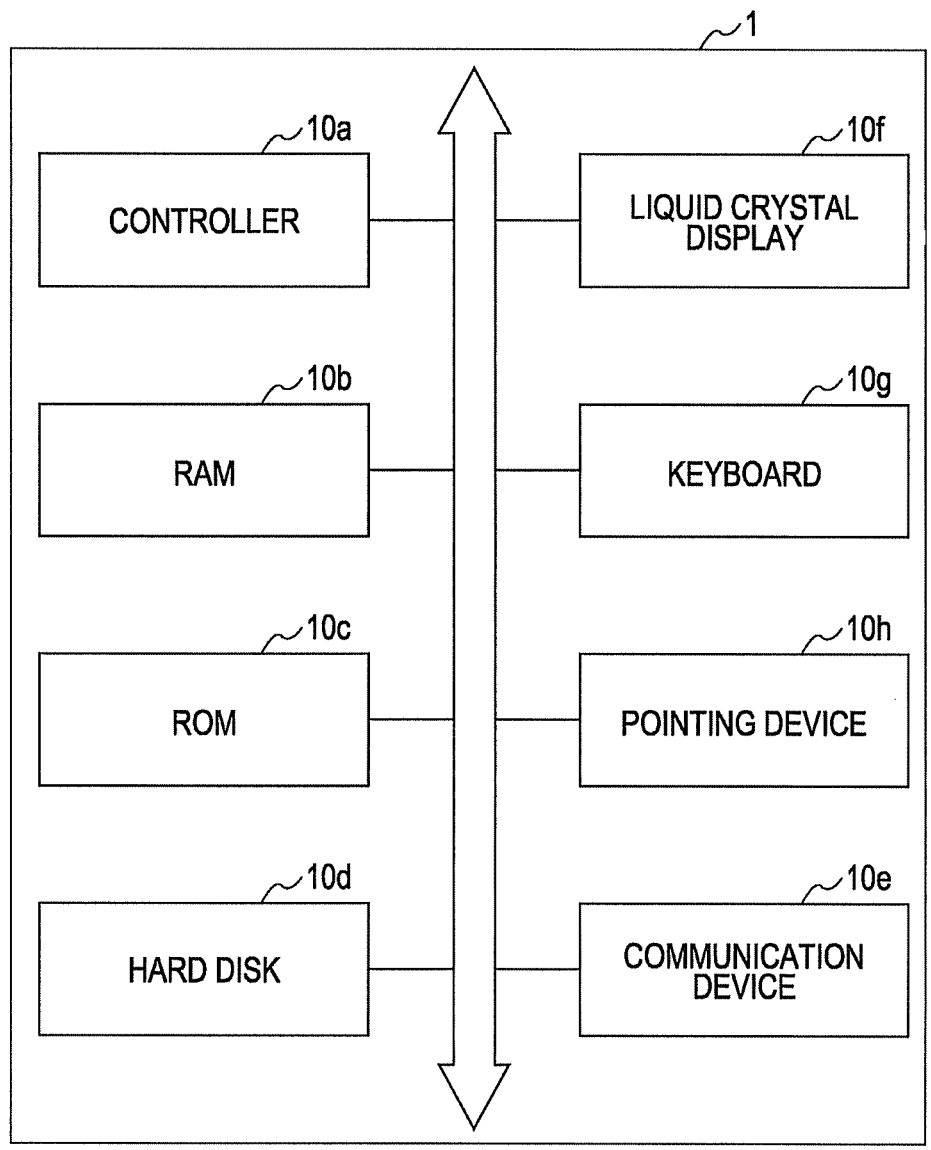
FIG. 2 illustrates an example of a configuration of a measuring device.
Figure 3:
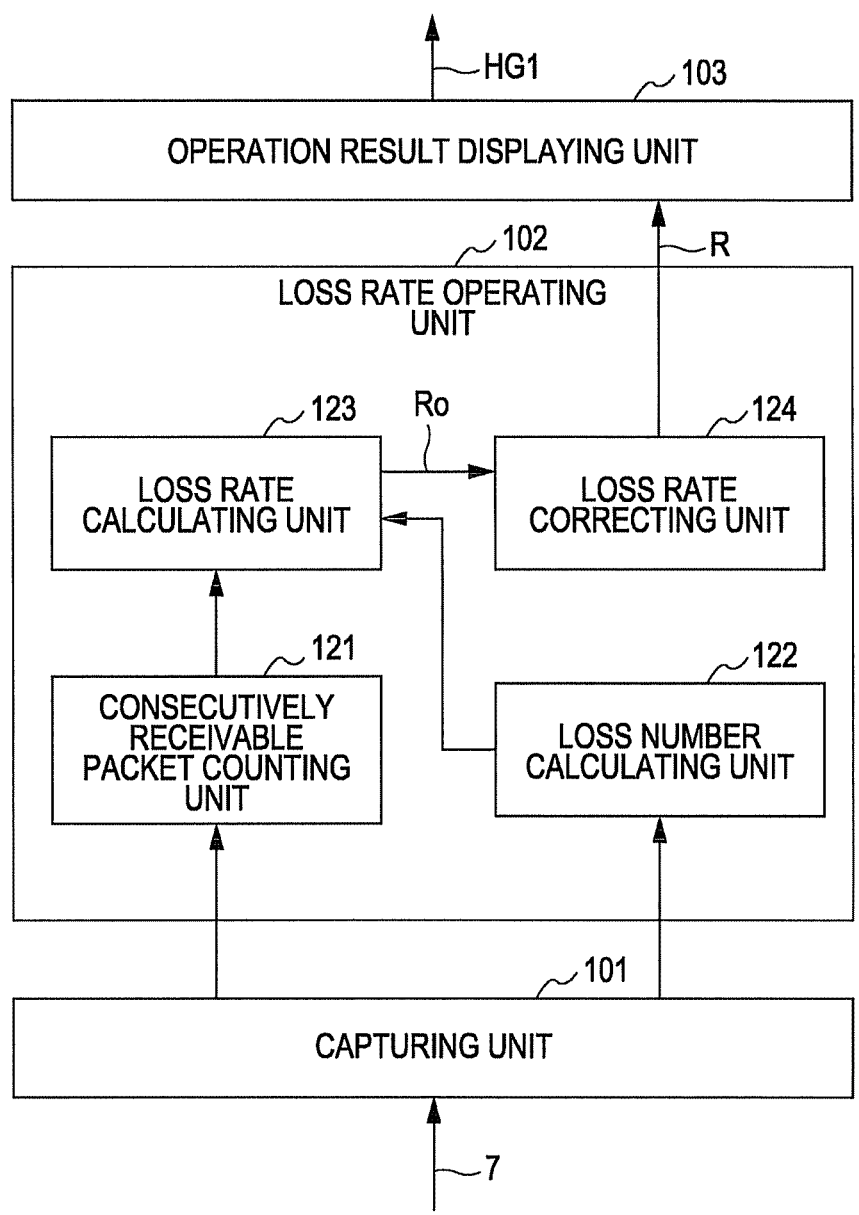
FIG. 3 illustrates an example of a functional configuration of a measuring device.

FIG. 1 illustrates a general configuration of a VoIP phone system SYS. FIG. 2 illustrates an example of a configuration of a measuring device 1. FIG. 3 illustrates an example of a functional configuration of the measuring device 1. FIG. 4 illustrates an example of an operation result screen HG1.

The VoIP phone system SYS is a system performing a voice call according to the VoIP (Voice over IP). The VoIP phone system SYS includes the measuring device 1, a plurality of terminals 2 (2A, 2B, . . . ), and a network 3.

The network 3 is a network for connecting the terminals 2 to each other and includes the IP (Internet Protocol) network. The IP network uses the Internet, LAN (Local Area Network), or the VoIP network of a phone business provider.

The terminal 2 is a terminal conforming to the VoIP used by a speaker (user) who makes a call through the network 3. The terminal 2 is, for example, a phone such as a business phone, a personal computer with a head set, or a cellular phone.

The measuring device 1 is a device for measuring a state of the network 3. The measuring device 1 is especially used for measuring the loss rate of RTP (Real-time Transport Protocol) packets.

The measuring device 1 includes a controller 10a, a RAM (Random Access Memory) 10b, a ROM (Read Only Memory) 10c, a hard disk 10d, a communication device 10e, a liquid crystal display 10f, a keyboard 10g, and a pointing device 10h, as illustrated in FIG. 2.

A measuring program for measuring the loss rate is stored in the ROM 10c and the hard disk 10d.

A program such as the measuring program is loaded into the RAM 10b depending on necessity. The data generated by execution of the program is also stored in the RAM 10b.

The controller 10a is, for example, a CPU (Central Processing Unit) or an MPU (Micro Processing Unit). The controller 10a executes the program read into the RAM 10b. Further, in the case where the controller 10a is the MPU, the RAM 10b and the ROM 10c are integrally built in the controller 10a in some cases.

The communication device 10e is a device such as NIC (Network Interface Card) for communicating with the other device through the network 3. The communication device 10e is especially used for capturing the packets flowing through the network 3 in an embodiment.

The liquid crystal display 10f displays a so-called GUI (Graphical User Interface) screen such as a screen indicating the state of the operation of the measuring device 1, a screen for inputting a command or data, and a screen describing a message for an operator of the measuring device 1 (hereinafter, it is referred to as "measurement operator"), as well as a screen indicating the loss rate of the RTP packet.

The keyboard 10g and the pointing device 10h are input devices used by the measurement operator to enter a command and data into the measuring device 1.

By executing the measuring program, the measuring device 1 performs the functions of a capturing unit 101, a loss rate operating unit 102, and an operation result displaying unit 103 illustrated in FIG. 3.

Next, the processing of the respective units of the measuring device 1 illustrated in FIG. 3 will be described in detail, by way of example, taking the case of calculating the loss rate when two terminals 2A and 2B make communications for a voice call.

The measurement operator previously specifies at least the two terminals that make the communications to be measured, in short, the terminals 2A and 2B. The measuring device 1 is set at a position where all the packets transmitted between the terminals 2A and 2B may be captured. For example, the measuring device 1 is connected to a VoIP router which is connected to either the terminal 2A or the terminal 2B. Alternatively, the measuring device 1 is connected to a VoIP gateway between the Internet and the phone network (fixed phone network or cellular phone network) of the phone business provider, in the network 3.

In FIG. 3, the capturing unit 101 of the measuring device 1 captures the RTP packet (hereinafter, described as "RTP packet 7") of the communications specified by the measurement operator, of the packets flowing through the device (VoIP router or VoIP gateway) to which this measuring device is connected.

According to an embodiment, all the RTP packets 7 are not captured but only some of them (portion) are captured.

For example, the capturing unit 101 captures the RTP packets 7 flowing for a predetermined time T. Further, the predetermined time T may be divided into a plurality of sections formed by a capturing time Ta and a non-capturing time Tb in order to capture only the RTP packets 7 flowing in the capturing time Ta and not to capture the RTP packets 7 flowing in the non-capturing time Tb. When the predetermined time T is 5.0 seconds, the capturing time Ta is 0.1 seconds, and the non-capturing time Tb is 0.1 seconds, the capturing starts and stops for every 0.1 seconds by turns. This is repeated for 5.0 seconds. The predetermined time may be set by a user or automatically generated by the system.

Every capturing time Ta does not need to be the same length. It is also possible that a time from starting or restarting the capturing to a point when a predetermined number of the RTP packets 7 may be captured (received) may be the capturing time Ta. Similarly to the non-capturing time Tb, every time does not need to be the same length.

When a predetermined time T includes the number k of capturing times Ta, each capturing time Ta may be hereinafter referred to as "capturing time Ta1", "capturing time Ta2", . . . , "capturing time Tak".

The loss rate operating unit 102 includes a consecutively receivable packet counting unit 121, a loss number calculating unit 122, a loss rate calculating unit 123, and a loss rate correcting unit 124. The loss rate operating unit 102 performs the processing for calculating the loss rate of the RTP packets 7 transmitted between the terminals 2A and 2B.

As mentioned above, since the capturing unit 101 captures the RTP packets 7 while thinning out some of them, the real loss rate may not be obtained accurately, similarly to the typical technique. The loss rate operating unit 102 also performs the processing for correcting (adjusting) the loss rate obtained through capturing the packets while thinning out some of them.

The consecutively receivable packet counting unit 121 counts the consecutively receivable packet number CA (CA1, CA2, ..., CAk) for every capturing time Ta (Ta1, Ta2, ..., Tak). The "consecutively receivable packet number CA" refers to a number of packets which could be received when any packet loss does not occur at all during a period from a capturing start point to an end point (in this example, the capturing time Ta), of all the packets belonging to a specific session (in this example, the RTP packets 7).

The consecutively receivable packet counting unit 121 may obtain the consecutively receivable packet number CA in each capturing time Ta according to the following Equation 1.

$$CAi = SQEi - SQSi + 1 \qquad \text{Equation 1}$$

Where, "i" indicates the number of the capturing time Ta and i=1, 2, ..., k. Hereinafter, "i" indicates in the same way. The "SQSi" is the sequence number of the RTP packet 7 which is captured first in the capturing time Tai. The "SQEi" is the sequence number of the RTP packet 7 which is captured last in the capturing time Tai.

The loss number calculating unit 122 calculates the loss number CL (CL1, CL2, ..., CLk) for every capturing time Ta (Ta1, Ta2, ... Tak). The "loss number CL" refers to a number of the lost RTP packets 7 which may not be captured, although they should be captured in the capturing time Ta.

The loss number calculating unit 122 may obtain the loss number CL in each capturing time Ta according to the following Equation 2.

$$CLi = CAi - CRi \qquad \text{Equation 2}$$

Where, "CRi" is the number of the RTP packets 7 which may be captured (received) in the capturing time Tai (capturing success number).

The loss rate calculating unit 123 calculates the loss rate Ro of the RTP packets 7 in all the capturing times Ta (Ta1, Ta2, ..., Tak) based on the following Equation 3.

Equation 3

$$Ro = \left( \frac{\sum_{i=1}^{k} CLi}{\sum_{i=1}^{k} CAi} \right) \times 100[\%] \qquad (3)$$

In other words, it calculates the ratio of all the loss numbers CL to all the consecutively receivable packet numbers CA as the loss rate Ro. As understood from this calculation method, the loss rate Ro is calculated based on only the result of actually sampling the RTP packets 7 and no correction is performed. Therefore, the loss rate Ro may be said as an apparent loss rate. Hereinafter, the loss rate Ro is described as "apparent loss rate Ro".

The loss rate correcting unit 124 obtains the real loss rate (hereinafter, described as "real loss rate R") in the network 3 by using the following Equation 4 to correct the apparent loss rate Ro calculated by the loss rate calculating unit 123.

$$R = Ro \cdot n / (n - \alpha) \qquad \text{Equation 4}$$

Where $$n = \frac{\sum_{i=1}^{k} CAi}{k} \qquad (4)$$

"α" is a positive fixed number, for example, "2".

As mentioned above, the apparent loss rate Ro, the real loss rate R, and an average value of the consecutively receivable packet number CA for one capturing time Ta (hereinafter, described as "consecutively receivable packet number average value n") are calculated through the processing by the respective units of the loss rate operating unit 102.

The values of the apparent loss rate Ro and the real loss rate R of the RTP packets 7 in a session between the terminals 2A and 2B are calculated in the above mentioned example. In the same way, the values in a session between the other terminals will be calculated by the capturing unit 101 and the loss rate operating unit 102.

The operation result displaying unit 103 generates an operation result screen HG1 indicating values of the respective items in each session calculated (operated) by the loss rate operating unit 102, as illustrated in FIG. 4 and displays it on the liquid crystal display 10f.

Figure 5:
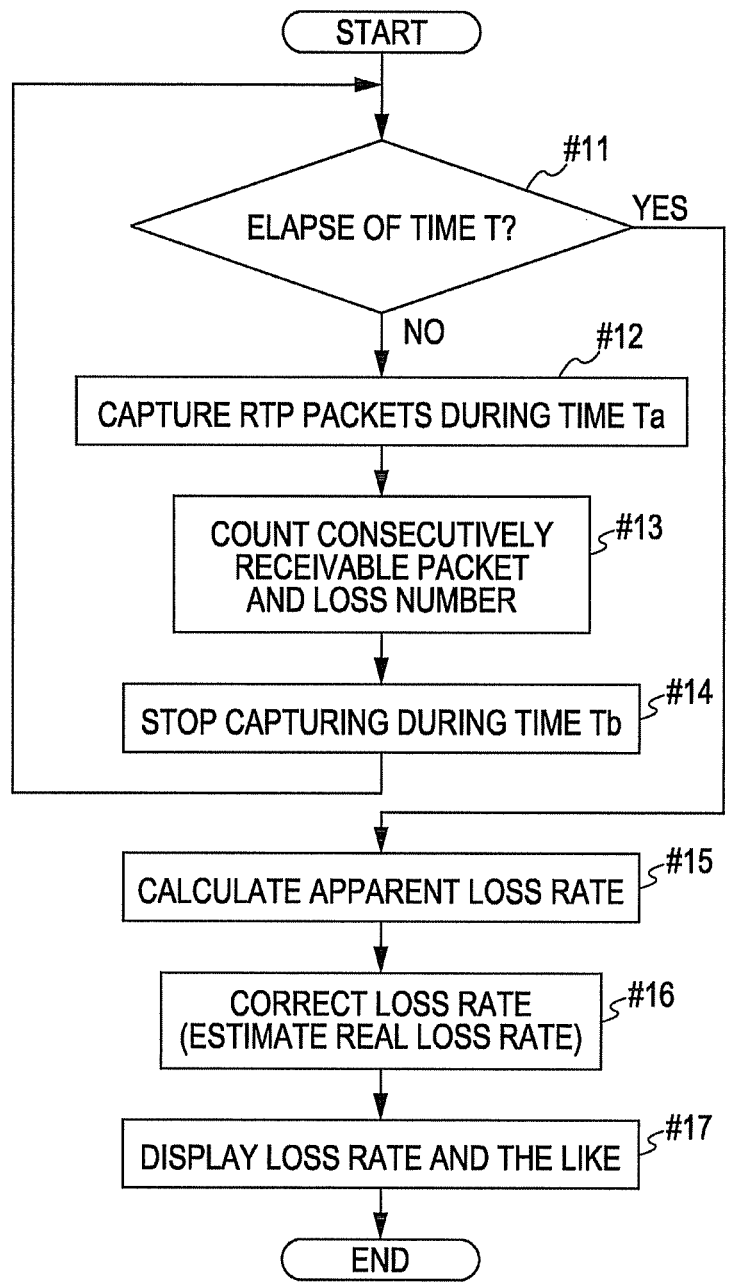
FIG. 5 is a flow chart for describing a processing flow of a measuring device.

FIG. 5 is a flow chart for describing an example of a processing flow in the measuring device 1. The flow of the measuring processing of the loss rate in the measuring device 1 will be described with reference to the flow chart in FIG. 5.

For example, when a session between the terminals 2A and 2B is established, the measuring device 1 measures the loss rate of the RTP packets 7 in this session according to the following procedure.

After the session is established, the measuring device 1 repeats the start and stop of capturing the RTP packets 7 transmitted between the terminals 2A and 2B until the predetermined time T elapses (Yes in #11 in FIG. 5, #12 to #14). In other words, it repeats a pattern of capturing the RTP packets 7 during the capturing time Ta (#12) and not capturing during the non-capturing time Tb (#14) until the predetermined time T elapses. Further, during the above period, a total of the consecutively receivable packet numbers CA and a total of the loss numbers CL are calculated based on the sequence number and the number of the captured RTP packets 7 (#13) according to above mentioned Equations (1) and (2).

The measuring device 1 calculates the apparent loss rate Ro by using the Equation (3) (#15) and calculates the real loss rate R (#16) by correcting the apparent loss rate Ro according to the Equation (4).

The measuring device 1 displays the operation result screen HG1 indicating the apparent loss rate Ro and the real loss rate R (#17).

Further, when it already displays the operation result screen HG1, the measuring device 1 adds the measurement values of the apparent loss rate Ro and the real loss rate R in the session between the terminals 2A and 2B, which are newly measured, to the operation result screen HG1. The measuring device 1 measures the apparent loss rate Ro and the real loss rate R in the session periodically until the session is closed (#11 to #16). Every time it measures, the measuring device 1 updates the operation result screen HG1 and displays the newest measurement values (#17).

Also, in the session between the terminals other than the terminals 2A and 2B, the measuring device 1 measures the apparent loss rate Ro and the real loss rate R periodically during the period from establishment to closing of the session (#11 to #16). Every time it obtains the measurement values, the measuring device 1 newly displays the operation result screen HG1 with the same values (#17).

Figure 6:
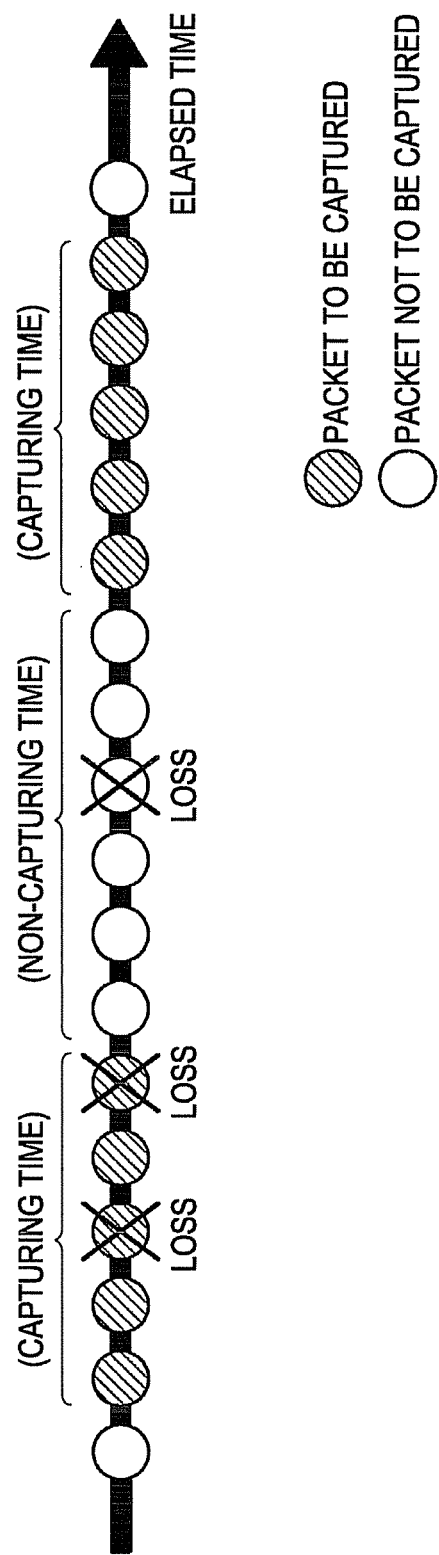
FIG. 6 illustrates an example in which packet loss occurs in a boundary between capturing time and non-capturing time or near the boundary.

FIG. 6 illustrates an example in which the packet loss occurs in the boundary between the capturing time and the non-capturing time or near there.

According to an embodiment, the real loss rate R is obtained by multiplying the loss rate (apparent loss rate Ro) obtained through sampling the RTP packets 7 by a coefficient larger than one. Therefore, the real loss rate may be measured more accurately than heretofore, in the case of measuring the loss rate by sampling the packets.

In the case of sampling the RTP packets 7, when packet loss occurs in the boundary between the capturing time Ta and the non-capturing time Tb or near there as illustrated in FIG. 6, the packet loss may not be detected. Therefore, the lower result is obtained than the real loss rate in the case of measuring the loss rate through sampling.

As mentioned above, however, the measuring device 1 corrects the loss rate obtained through sampling by multiplying the above by a larger coefficient than one, thereby making it possible to measure the real loss rate more accurately than heretofore.

According to the larger consecutively receivable packet number average value n, the smaller (more approximate to one) coefficient is used to correct the rate, thereby making it possible to measure the real loss rate more accurately.

Figure 7:
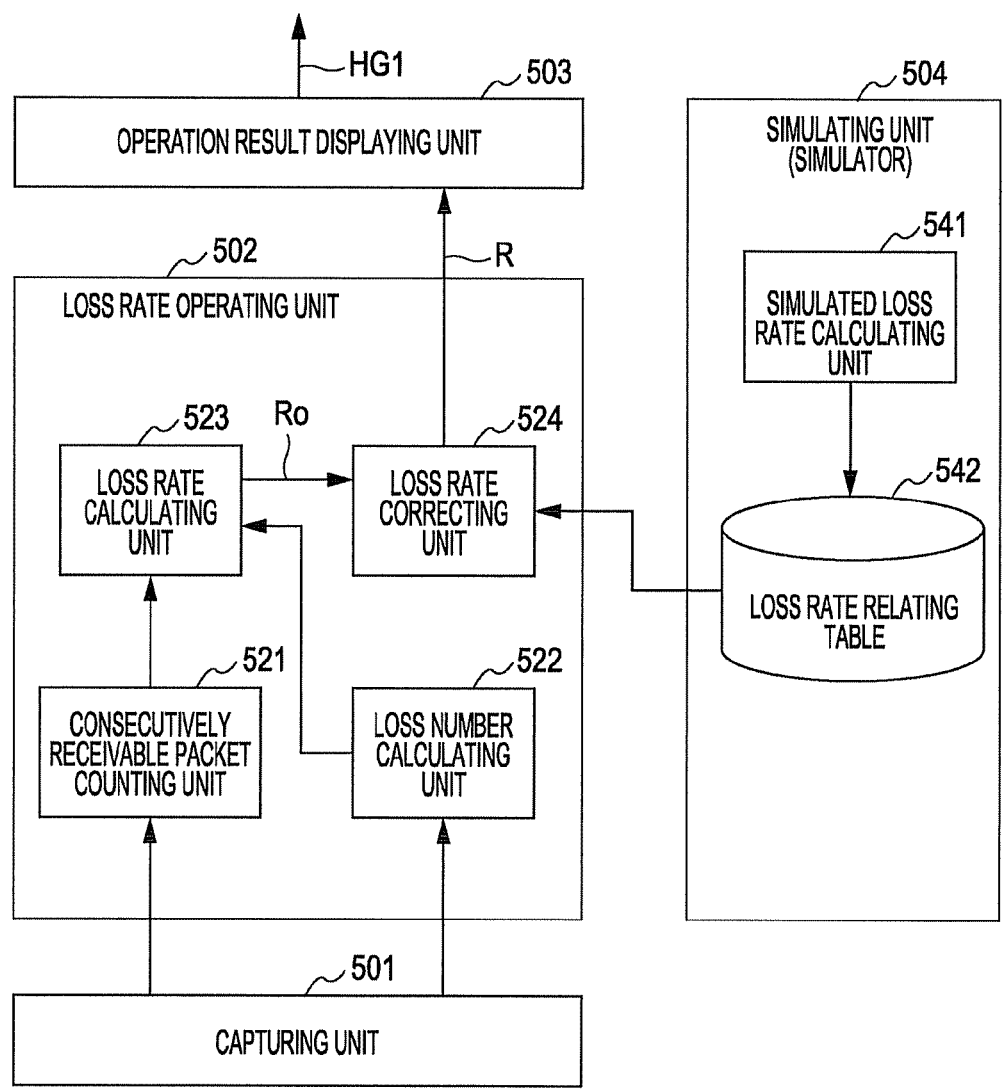
FIG. 7 illustrates an example of a functional configuration of a measuring device according to an embodiment.
Figure 8:
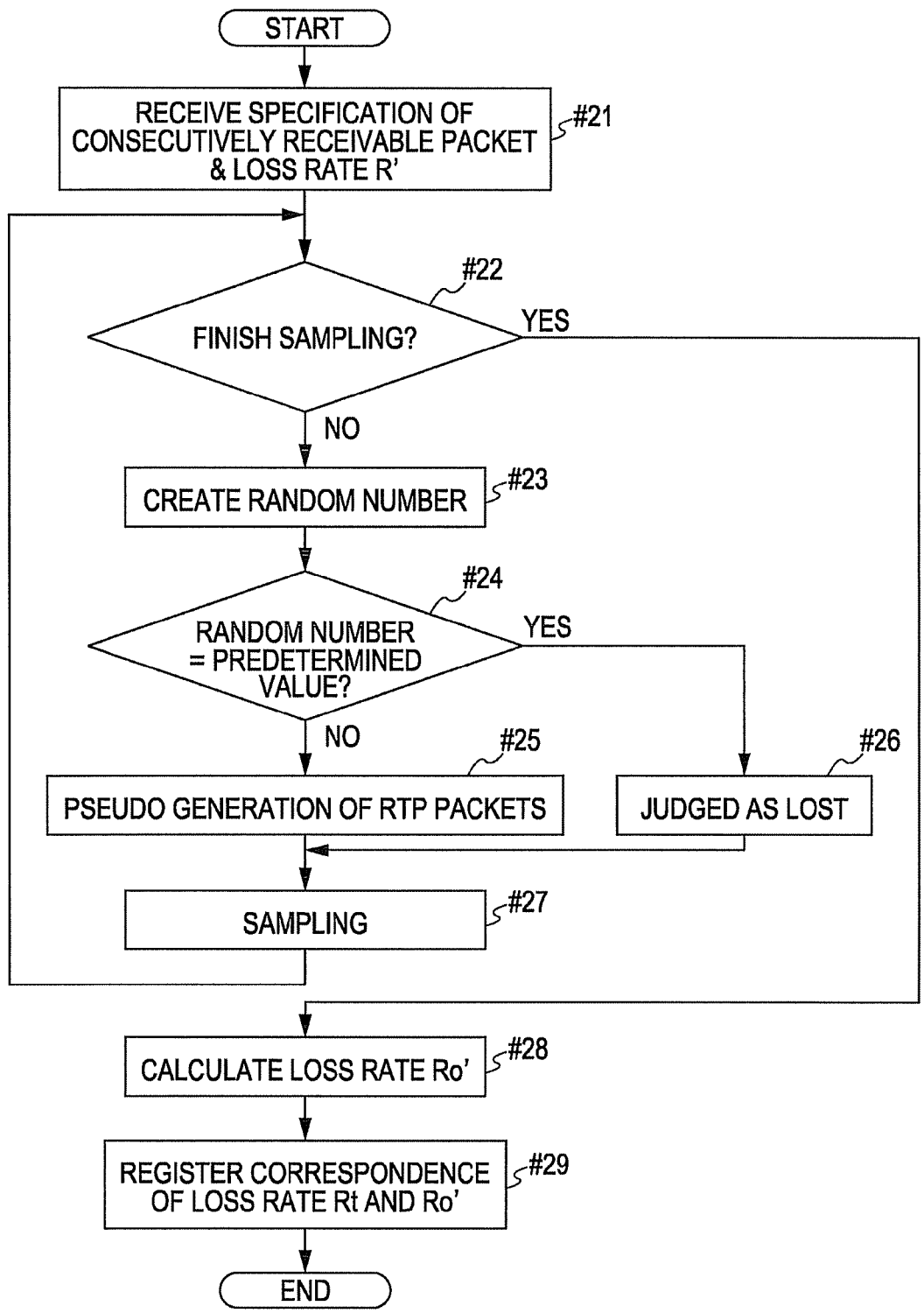
FIG. 8 is a flow chart for describing an example of a processing flow for generating correspondence data.

FIG. 7 illustrates a functional configuration of a measuring device 1 according to an embodiment. FIG. 8 is a flow chart for describing an example of a flow of the processing for generating the correspondence data 8. FIG. 9 illustrates an example of a loss rate relating table 542.

In an embodiment, the more accurate real loss rate R is measured (estimated) by correcting the loss rate measured through sampling, or the apparent loss rate Ro, according to the Equation (4). In an embodiment, the real loss rate R is calculated by correcting the apparent loss rate Ro with the data previously obtained by a simulator.

The general configuration of the VoIP phone system SYS in an embodiment is the same as that in the above-identified embodiment and as illustrated in FIG. 1. The configuration of the measuring device 1 is the same as that in the above-identified embodiment and as illustrated in FIG. 2. The ROM 10c and the hard disk 10d store a program for realizing a capturing unit 501, a loss rate operating unit 502, an operation result displaying unit 503, and a simulating unit 504 illustrated in FIG. 7.

Hereinafter, the function of the capturing unit 501 and the simulating unit 504 is described. The overlapping portion with the above-identified embodiment is not described.

Provided with a simulated loss rate calculating unit 541 and a loss rate relating table 542, the simulating unit 504 simulates the RTP packets 7 flowing through the network 3 and obtains the apparent loss rate Ro' by sampling the loss rate of the RTP packets 7. It obtains the corresponding relation between the real loss rate R' and the sampling-measured loss rate Ro' and stores the data indicating the relation. Hereinafter, the contents of the respective units in the simulating unit 504 will be described in detail.

The simulated loss rate calculating unit 541 simulates the RTP packets 7 flowing through the network 3 for one session according to the procedure as illustrated in FIG. 8 and performs the sampling measurement of the loss rate. Hereinafter, the simulated RTP packets 7 are referred to as "RTP packets 7B".

In an embodiment, the measurement operator specifies a sampling rate for the measuring device 1. In an embodiment, the measuring device 1 specifies how many RTP packets 7B are captured (received) in series and how many RTP packets 7B are thinned out in series. Further, it specifies the real loss rate R'. Hereinafter, the number of the packets captured in series is referred to as "consecutively captured packet number PN" and the number of the packets thinned out in series is referred to as "consecutively thinned-out packet number PM".

Upon receipt of the specification (#21 in FIG. 8), the simulated loss rate calculating unit 541 generates the RTP packets 7B one after another so that the loss may appear just for the real loss rate R' (#23 to #26). In other words, random numbers are generated one after another so that a specific value may appear in a probability of the real loss rate R' (#23).

When the random number is not the specific value (No in #24), it is regarded that there occurs no loss and the measuring device 1 simulates the RTP packet 7B arriving at the measuring device 1 (#25). On the other hand, when the random number is the specific value (Yes in #24), it is regarded that the RTP packet 7B is lost and does not arrive at the measuring device 1 (#26).

In this way, the transmission of the RTP packets 7B through the network 3 during a certain session is simulated.

The simulated loss rate calculating unit 541 samples the RTP packets 7B simulated as mentioned above (#27) at the sampling rate received in Operation #21. Specifically, it repeats capturing the consecutively captured packet number PN of the RTP packets 7B and thinning out (not capturing) the consecutively thinned-out packet number PM of the RTP packets 7B, for a predetermined period of time.

During the period, the simulated loss rate calculating unit 541 counts the consecutively receivable packet number CA and the capturing success packet number CR in every time of capturing and calculates the loss number CL, similarly to the case of the measurement processing in the above-identified embodiment. Hereinafter, the counted or calculated consecutively receivable packet number CA, capturing success packet number CR, and loss number CL are referred to as "consecutively receivable packet number CA'", "capturing success packet number CR'", and "loss number CL'", respectively, in order to distinguish them from those calculated by the loss rate operating units 102 and 502.

The sampling loss rate calculating unit 541 finishes the sampling at a predetermined elapsed time (Yes in #22) and calculates the apparent loss rate Ro' according to the following Equation 5 based on the consecutively receivable packet number CA' and the loss number CL' obtained by the sampling (#28).

Equation 5

$$Ro' = \left( \frac{\sum_{i=1}^{k} CL'i}{\sum_{i=1}^{k} CA'i} \right) \times 100[\%] \qquad (5)$$

The simulated loss rate calculating unit 541 generates the correspondence data 8 indicating the calculated apparent loss rate Ro', the specified real loss rate R', the consecutively captured packet number PN, and the consecutively thinned-out packet number PM and registers the above into the loss rate relating table 542 (#29).

The simulated loss rate calculating unit 541 further receives the specification about the real loss rate R', the consecutively captured packet number PN, and the consecutively thinned-out packet number PM (#21) by the other different values, calculates each apparent loss rate Ro' (#22 to #28), and similarly registers the above correspondence data 8 into the loss rate relating table 542 (#29).

In this way, a large amount of correspondence data 8 is registered into the loss rate relating table 542, as illustrated in FIG. 9.

Returning to FIG. 7, the capturing unit 501 captures the RTP packets 7 during a session to be measured, similarly to the capturing unit 101 (refer to FIG. 3) in an embodiment.

The loss rate operating unit 502 includes a consecutively receivable packet counting unit 521, a loss number calculating unit 522, a loss rate calculating unit 523, and a loss rate correcting unit 524, and calculates the loss rate of the RTP packets 7 transmitted between the terminals, similarly to the loss rate operating unit 102 in an embodiment.

The processing of the consecutively receivable packet counting unit 521, the loss number calculating unit 522, and the loss rate calculating unit 523 is the same as that of the consecutively receivable packet counting unit 121, the loss number calculating unit 122, and the loss rate calculating unit 123 in an embodiment. According to the processing of the consecutively receivable packet counting unit 521 and the loss rate calculating unit 523, the average (consecutively receivable packet number average n) of the consecutively receivable packet number CA and the apparent loss rate Ro are obtained.

The role of the loss rate correcting unit 524 is the same as the loss rate correcting unit 124 in an embodiment and the loss rate correcting unit 524 corrects the apparent loss rate Ro calculated by the loss rate calculating unit 523 to calculate the real loss rate R. In an embodiment, however, instead of the Equation 3, the correspondence data 8 stored in the loss rate relating table 542 is used as follows.

The loss rate correcting unit 524 searches for the correspondence data 8 indicating the consecutively captured packet number PN having the same value as the current consecutively receivable packet number average n. When there is no such correspondence data 8, the loss rate correcting unit 524 searches for the correspondence data 8 indicating the consecutively captured packet number PN most approximate to this consecutively receivable packet number average n.

Further, the loss rate correcting unit 524 selects the correspondence data 8 indicating the apparent loss rate Ro' having the same value as this apparent loss rate Ro from the searched correspondence data 8. When there is no such correspondence data 8, the loss rate correcting unit 524 selects the correspondence data 8 indicating the apparent loss rate Ro' most approximate to this apparent loss rate Ro.

The loss rate correcting unit 524 selects the real loss rate R' indicated in the selected correspondence data 8 as a correction value of this apparent loss rate Ro (real loss rate R).

For example, when the current consecutively receivable packet number average n is "10.1" and the current apparent loss rate Ro is "0.7991(%)", the correspondence data 8b, 8f, 8j are searched and further, the correspondence data 8f is selected from the above data. Therefore, "1.0000(%)" becomes the real loss rate R.

When there is no correspondence data 8 indicating the apparent loss rate Ro' having the same value as this apparent loss rate Ro, a method for estimating R by obtaining a weighted average from the values of R' corresponding to the adjacent Ro' to Ro may be considered, other than the above-mentioned method for selecting the correspondence data 8 indicating the apparent loss rate Ro' most approximate to this apparent loss rate Ro.

Similarly to the operation result displaying unit 103 in the above-identified embodiment, the operation result displaying unit 503 generates the operation result screen HG1 (refer to FIG. 4) indicating the values of the respective items in each session calculated by the loss rate operating unit 502 and displays the above on the liquid crystal display 10f.

The flow of a processing by the measuring device 1 in an embodiment is similar to that in an embodiment, as described in FIG. 5. The correcting method of the apparent loss rate Ro in Operation #16, however, is different from the above-identified embodiment, as mentioned above.

According to an embodiment, the real loss rate R is obtained by correcting the loss rate Ro calculated through sampling of the RTP packets 7, according to the relation among the apparent loss rate Ro', the consecutively receivable packet number average n, and the real loss rate R' obtained previously through the simulation. Therefore, the more accurate real loss rate R may be calculated than the typical technique.

Figure 10:
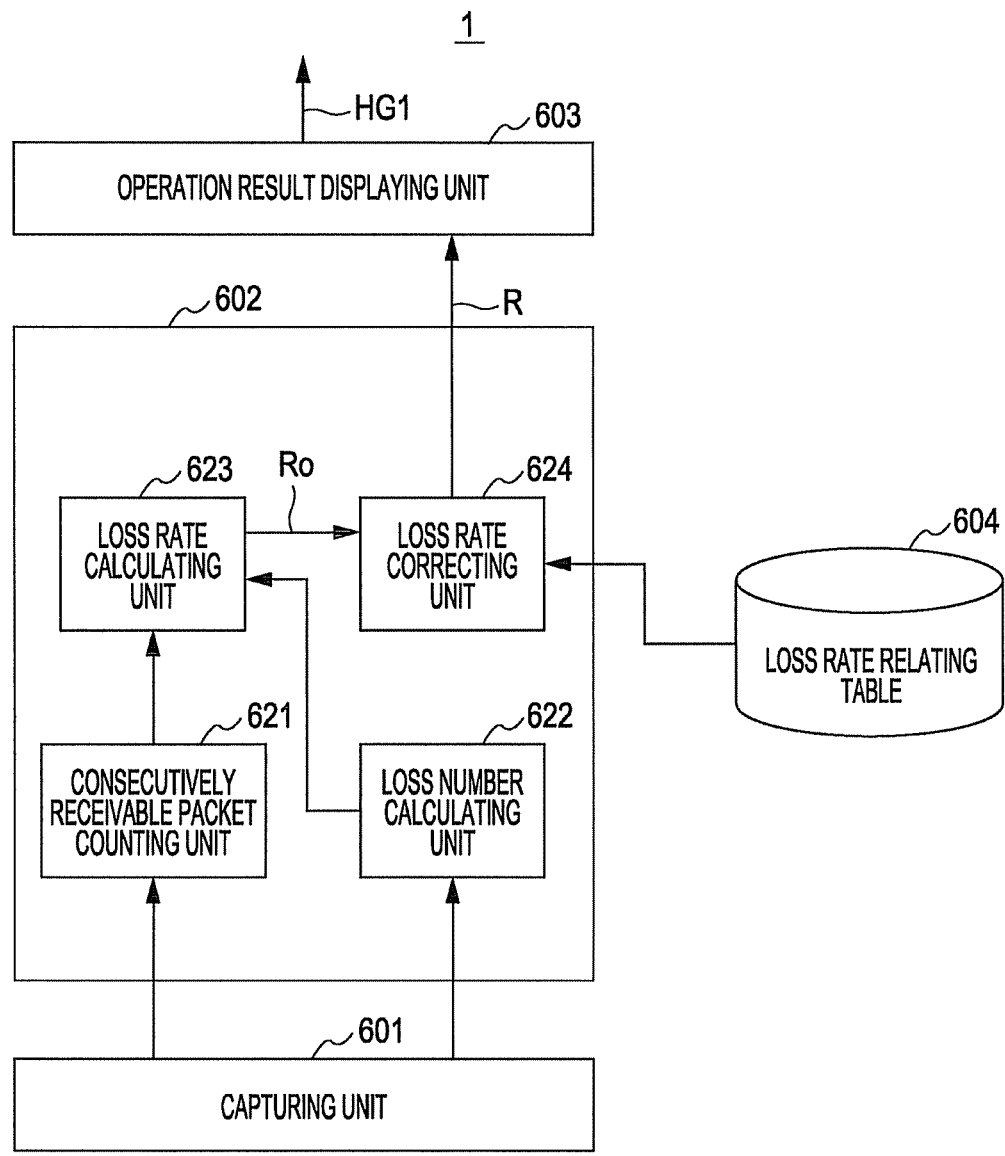
FIG. 10 illustrates an example of a functional configuration of a measuring device according to an embodiment.
Figures 11, 12:
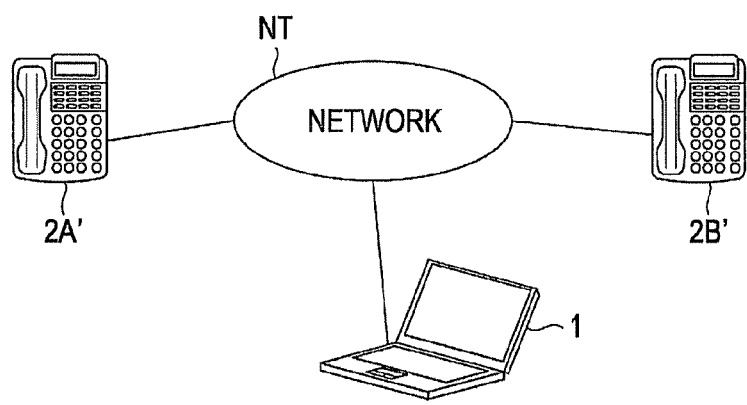
FIG. 11 illustrates an example of a loss rate relating table.
FIG. 12 illustrates an example of a network for obtaining a loss rate relating table.

FIG. 10 illustrates an example of a functional configuration of a measuring device 1 according to an embodiment. FIG. 11 illustrates an example of a loss rate relating table 604. FIG. 12 illustrates an example of a network NT for gaining the loss rate relating table 604.

In an embodiment, a relationship among the real loss rate R', the consecutively captured packet number PN, and the apparent loss rate Ro' measured through sampling is previously obtained through simulation. And based on the relationship, the apparent loss rate Ro newly measured at the operation is corrected, hence to obtain the real loss rate R. In an embodiment, a relation among the apparent loss rate Ro measured at the past operation, the consecutively receivable packet number in measuring the above, and the real loss rate R with it corrected may be obtained. And based on the relationship, the apparent loss rate Ro newly measured may be corrected, hence to obtain the real loss rate R.

For example, with lot of data indicating the apparent loss rate Ro at the past operation, the consecutively receivable packet number, and the real loss rate R stored, a relation among the apparent loss rate Ro, the average n of the consecutively receivable packet number, and the real loss rate R is obtained. Based on the relation, the apparent loss rate Ro newly measured may be corrected, to obtain the real loss rate R.

Alternatively, a table corresponding to the loss rate relating table 542 in an embodiment may be created and based on the table, the apparent loss rate Ro newly measured may be corrected, to obtain the real loss rate R. Hereinafter, another embodiment will be described, by way of example, by taking the table.

The general configuration of the VoIP phone system SYS according to an embodiment is the same as in the case of the above-identified embodiments, as illustrated in FIG. 1. The configuration of the measuring device 1 is also the same as that in the case of the above-identified embodiments, as illustrated in FIG. 2. Here, a program for realizing the capturing unit 601, the loss rate operating unit 602, the operation result displaying unit 603, and the loss rate relating table 604 as illustrated in FIG. 10 is stored in the ROM 10c and the hard disk 10d.

Hereinafter, the capturing unit 601 and the loss rate relating table 604 will be described. The overlapping portions with the above-identified embodiment will not be described.

The loss rate relating table 604 is a table corresponding to the loss rate relating table 542 of the above-identified embodiment, illustrating the relation among the real loss rate R', the consecutively captured number of the packets PN, and the apparent loss rate Ro' as illustrated in FIG. 11. The contents of the loss rate relating table 604 will be obtained as follows.

As illustrated in FIG. 12, the test terminals, that is, the terminals 2A' and 2B', and the measuring device 1 are connected to the network NT. The network NT is a network having a higher communication quality than the network 3. It is preferable that the packet loss hardly occurs and it is the most preferable that packet loss never occurs. Alternatively, the network 3 under the condition that packet loss hardly occurs may be used as the network NT.

A measurement operator specifies the sampling rate (the consecutively captured packet number PN and the consecutively thinned-out packet number PM) and the real loss rate R', similarly to the above-identified embodiment.

The terminal 2A' establishes a session with the terminal 2B' and transmits the RTP packets 7C to the terminal 2B'. Where, the terminal 2A' is not allowed to transmit the RTP packets 7C in a probability of the loss rate R' because some of the RTP packets 7C are intentionally lost with the real loss rate R' specified by the measurement operator.

The measuring device 1 samples and measures the apparent loss rate Ro' according to the method described in Operations #11 to #15 in FIG. 5 in the above-identified embodiment. The sampling rate specified by the measurement operator is adopted to the sampling rate here. When sampling and measuring the apparent loss rate Ro', the measuring device 1 obtains the consecutively receivable packet number average n as the average of the consecutively receivable packet number CA.

The measuring device 1 measures the apparent loss rate Ro several times at the real loss rate R' and the sampling rate of the same values. While changing these values variously, the measuring device 1 measures the apparent loss rate Ro. According to this, the possible range of the apparent loss rate Ro is found according to the real loss rate R' and the consecutively captured packet number PN. As illustrated in FIG. 11, the data indicating the real loss rate R, the consecutively captured packet number PN, and the range of the apparent loss rate Ro' is stored into the loss rate relating table 604.

The above processing may be performed by the measuring device for test, instead of the measuring device 1.

Returning to FIG. 10, the capturing unit 601 captures the RTP packets 7 during a session to be measured, similarly to the capturing unit 101 $t$ (refer to FIG. 3) and the capturing unit 501 (refer to FIG. 7).

The loss rate operating unit 602 includes a consecutively receivable packet counting unit 621, a loss number calculating unit 622, a loss rate calculating unit 623, and a loss rate correcting unit 624, and performs the processing for calculating the loss rate of the RTP packets 7 transmitted between the terminals, similarly to the loss rate operating unit 102 and the loss rate operating unit 502.

The processing of the consecutively receivable packet counting unit 621, the loss number calculating unit 622, and the loss rate calculating unit 623 is the same as that of the consecutively receivable packet counting units 121 and 521, the loss number calculating units 122 and 522, and the loss rate calculating units 123 and 523 respectively in the above-identified embodiments. According to the consecutively receivable packet counting unit 621 and the loss rate calculating unit 623, the average of the consecutively receivable packet number CA (consecutively receivable packet number average n) and the apparent loss rate Ro are obtained.

The role of the loss rate correcting unit 624 is the same as that of the loss rate correcting unit 124 and that of the loss rate correcting unit 524, and the loss rate correcting unit 624 obtains the real loss rate R by correcting the apparent loss rate Ro calculated by the loss rate calculating unit 623. In an embodiment, however, the loss rate relating table 604 is used.

The method of using the loss rate relating table 604 is the same as the method of using the loss rate relating table 542 in an embodiment.

For example, when the apparent loss rate Ro to be corrected this time is "0.5055(%)" and the consecutively receivable packet number average n is "42", the real loss rate R becomes "0.63(%)".

The operation result displaying unit 603 generates the operation result screen HG1 (refer to FIG. 4) indicating the values of the respective items of each session calculated (operated) by the loss rate operating unit 602 and displays the above on the liquid crystal display 10f, similarly to the operation result displaying unit 103 and the operation result displaying unit 503.

The flow of a processing by the measuring device 1 according to an embodiment is the same as that in the above-identified embodiment, as described in FIG. 5. The method of measuring the apparent loss rate Ro in Operation #16 is different from that in the above-identified embodiment. The table to use is different from that in the other above-identified embodiment.

According to an embodiment, the real loss rate R may be obtained by correcting the loss rate Ro measured through sampling of the RTP packets 7, according to the relation between the apparent loss rate Ro' and the real loss rate R' obtained previously through the actual measurement. Therefore, the real loss rate R may be measured more accurately than ever. Further, by correcting it taking the consecutively receivable packet number average n into consideration, the real loss rate R may be measured even more accurately.

In an embodiment, the apparent loss rate Ro is corrected using the coefficient of "n/(n−α)" as illustrated in the Equation (4); however, any other coefficient than this may be used as long as the smaller coefficient (approximate to one) is used to correct the above as the consecutively receivable packet number average n becomes larger.

In the embodiments, the case of measuring the loss rate of the RTP packets 7 has been described by way of example; however, the invention may be applied to the case of measuring the loss rate of the packets of the other protocol.

Besides, a general configuration or a structure of each unit of the VoIP phone system SYS or the measuring device 1, the processing contents, the procedure of the processing, and the structure of the table may be properly changed.

According to the invention, it is possible to measure the loss rate more accurately than ever when sampling the packets and measuring their loss rate.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. A method of measuring packet loss rate, comprising:
   intermittently capturing packets during a period of time of a session including at least one capturing time for capturing the packets and a non-capturing time, by a measuring device;
   counting a capture success number indicating a number of the packets captured in every capturing time of the period of time, and a capturable number indicating a possible number of packets to be captured by the measuring device during capturing times of the period of time without loss;
   calculating a loss rate indicating a ratio of all loss of packets according to the capture success number and the capturable number for every period of time, by the measuring device; and
   correcting the loss rate, using the measuring device, to have a larger value accordingly as an average of the capturable number of packets of said every period of time becomes smaller,
   wherein the captured packets correspond to first packets, and
   the method further comprising:
      simulating flowing of second packets which are virtual packets through a virtual network so that the second packets are lost at a second loss rate, by a simulator;
      simulating capturing of the second packets several times while changing a consecutively captured number indicating a number of the packets consecutively captured and the second loss rate, by the simulator;
      counting a second capturable number indicating a number of the second packets which are to be captured without loss when consecutively capturing the packets with the consecutively captured number and which are simulated so that the packets are lost at the second loss rate, for every combination of the consecutively captured number and the second loss rate, by the simulator;
      calculating a third loss rate indicating a rate of losing the second packets in a combination, according to the second capturable number corresponding to the combination of the consecutively captured number and the second loss rate and the same consecutively captured number, by the simulator; and
      storing loss rate relating data indicating the third loss rate corresponding to the combination, the consecutively captured number forming the same combination, and the second loss rate forming the same combination, into a storing unit, by the simulator, and
   wherein the loss rate is corrected to the second loss rate which corresponds to the third loss rate most approximate to the loss rate and to the consecutively captured packet number most approximate to the average.

2. The method of measuring packet loss rate according to claim 1, wherein the correcting of the loss rate includes multiplying a larger coefficient as the average gets smaller.

3. The method of measuring packet loss rate according to claim 1, comprising:
   transmitting third packets from one communication device to another communication device through another network having higher communication quality than the virtual network, the third packets having the third loss rate;
   capturing the third packets several times while changing a consecutively captured number indicating the number of the packets consecutively captured and the third loss rate, by the measuring device;
   counting a third capturable number which is a number of the third packets which are to be captured without loss when capturing the packets with the consecutively captured number and which are simulated so that the third packets are lost at the third loss rate, for every combination of the consecutively captured number and the third loss rate, by the measuring device;
   calculating a fourth loss rate indicating a rate of losing the third packets in a combination, according to the third capturable number corresponding to the combination of the consecutively captured number and the third loss rate and the same consecutively captured number, by the measuring device; and
   storing loss rate relating data indicating the fourth loss rate corresponding to the combination, the consecutively captured number forming the same combination, and the third loss rate forming the same combination into a storing unit, by the measuring device, and
   wherein the loss rate is corrected to the third loss rate which corresponds to the fourth loss rate most approximate to the loss rate and the consecutively captured number most approximate to the average.

4. The method of measuring packet loss rate according to claim 1, comprising:
   displaying the loss rate corrected for every session, by a communication device.

5. A packet loss measuring device, comprising:
   a memory; and
   a processor coupled to the memory and configured to execute a process including:
      intermittently capturing packets during a period of time of a session including at least one capturing time for capturing the packets and a non-capturing time where packets are not captured;
      counting a capture success number indicating a number of the packets captured, in every capturing time of the period of a time and a capturable number indicating a possible number of the packets to be captured during capturing times of the period of time without loss;
      calculating a loss rate indicating a ratio of all loss of the packets, according to the capture success number and the capturable number for every period of time; and correcting the loss rate to have a larger value as an average of the capturable number of packets of said every period of time becomes smaller,
wherein the captured packets correspond to first packets, and
the process further including:
  simulating flowing of second packets which are virtual packets through a virtual network so that the second packets are lost at a second loss rate, by a simulator;
  simulating capturing of the second packets several times while changing a consecutively captured number indicating a number of the packets consecutively captured and the second loss rate, by the simulator;
  counting a second capturable number indicating a number of the second packets which are to be captured without loss when consecutively capturing the packets with the consecutively captured number and which are simulated so that the packets are lost at the second loss rate, for every combination of the consecutively captured number and the second loss rate, by the simulator;
  calculating a third loss rate indicating a rate of losing the second packets in a combination, according to the second capturable number corresponding to the combination of the consecutively captured number and the second loss rate and the same consecutively captured number, by the simulator; and
  storing loss rate relating data indicating the third loss rate corresponding to the combination, the consecutively captured number forming the same combination, and the second loss rate forming the same combination, into a storing unit, by the simulator, and
wherein the loss rate is corrected to the second loss rate which corresponds to the third loss rate most approximate to the loss rate and to the consecutively captured packet number most approximate to the average.

6. A non-transitory computer-readable storage medium storing a program for a computer which controls a measuring device, the program causing the computer to execute a process, the process comprising:
  intermittently capturing packets during a period of time of a session including at least one capturing time for capturing the packets and a non-capturing time where packets are not captured;
  counting a capture success number indicating a number of the packets captured in every capturing time of the period of a time and a capturable number indicating a possible number of the packets to be captured during capturing times of the period of time without loss;
  calculating a loss rate indicating a ratio of all loss of packets, according to the capture success number and the capturable number for every period of time; and
  correcting the loss rate by adjusting to have a larger value as an average of the capturable number of packets of said every period of time becomes smaller,
wherein the captured packets correspond to first packets, and
the process further comprising:
  simulating flowing of second packets which are virtual packets through a virtual network so that the second packets are lost at a second loss rate, by a simulator;
  simulating capturing of the second packets several times while changing a consecutively captured number indicating a number of the packets consecutively captured and the second loss rate, by the simulator;
  counting a second capturable number indicating a number of the second packets which are to be captured without loss when consecutively capturing the packets with the consecutively captured number and which are simulated so that the packets are lost at the second loss rate, for every combination of the consecutively captured number and the second loss rate, by the simulator;
  calculating a third loss rate indicating a rate of losing the second packets in a combination, according to the second capturable number corresponding to the combination of the consecutively captured number and the second loss rate and the same consecutively captured number, by the simulator; and
  storing loss rate relating data indicating the third loss rate corresponding to the combination, the consecutively captured number forming the same combination, and the second loss rate forming the same combination, into a storing unit, by the simulator, and
wherein the loss rate is corrected to the second loss rate which corresponds to the third loss rate most approximate to the loss rate and to the consecutively captured packet number most approximate to the average.

7. A method of measuring packet loss rate, comprising:
intermittently capturing, by a measuring device, packets during a session;
counting a capture success number indicating a number of the first packets captured in every period of time for capturing the packets, and a capturable number indicating a possible number of packets to be captured by the measuring device during a period of time without loss;
calculating, by the measuring device, a loss rate indicating a ratio of all loss of packets according to the capture success number and the capturable number for every period of time;
correcting, using the measuring device, the loss rate to have a larger value accordingly as an average of the capturable number of packets of said every period of time becomes smaller;
simulating, by a simulator, flowing of second packets which are virtual packets through a virtual network so that the second packets are lost at a second loss rate;
simulating, by the simulator, capturing of the second packets several times while changing a consecutively captured number indicating a number of the packets consecutively captured and the second loss rate;
counting, by the simulator, a second capturable number indicating a number of the second packets which are to be captured without loss when consecutively capturing the packets with the consecutively captured number and which are simulated so that the packets are lost at the second loss rate, for every combination of the consecutively captured number and the second loss rate;
calculating, by the simulator, a third loss rate indicating a rate of losing the second packets in a combination, according to the second capturable number corresponding to the combination of the consecutively captured number and the second loss rate and the same consecutively captured number; and
storing, in a storing unit, loss rate relating data indicating the third loss rate corresponding to the combination, the consecutively captured number forming the same combination, and the second loss rate forming the same combination, by the simulator, and
wherein the loss rate is corrected to the second loss rate which corresponds to the third loss rate most approximate to the loss rate and to the consecutively captured packet number most approximate to the average.

8. The method according to claim 7, wherein the correcting of the loss rate includes multiplying a larger coefficient as the average gets smaller.

9. The method according to claim 7, comprising:
transmitting third packets from one communication device to another communication device through another network having higher communication quality than the virtual network, the third packets having the third loss rate;
capturing the third packets several times while changing a consecutively captured number indicating the number of the packets consecutively captured and the third loss rate, by the measuring device;
counting a third capturable number which is a number of the third packets which are to be captured without loss when capturing the packets with the consecutively captured number and which are simulated so that the third packets are lost at the third loss rate, for every combination of the consecutively captured number and the third loss rate, by the measuring device;
calculating a fourth loss rate indicating a rate of losing the third packets in a combination, according to the third capturable number corresponding to the combination of the consecutively captured number and the third loss rate and the same consecutively captured number, by the measuring device; and
storing loss rate relating data indicating the fourth loss rate corresponding to the combination, the consecutively captured number forming the same combination, and the third loss rate forming the same combination into a storing unit, by the measuring device, and
wherein the loss rate is corrected to the third loss rate which corresponds to the fourth loss rate most approximate to the loss rate and the consecutively captured number most approximate to the average.

10. The method according to claim 7, comprising:
displaying the loss rate corrected for every session, by a communication device.

* * * * *